Feb. 20, 1962 R. A. KIRK 3,021,771
FINDER SIGNAL FOR PHOTOGRAPHIC CAMERAS
Filed Oct. 2, 1959
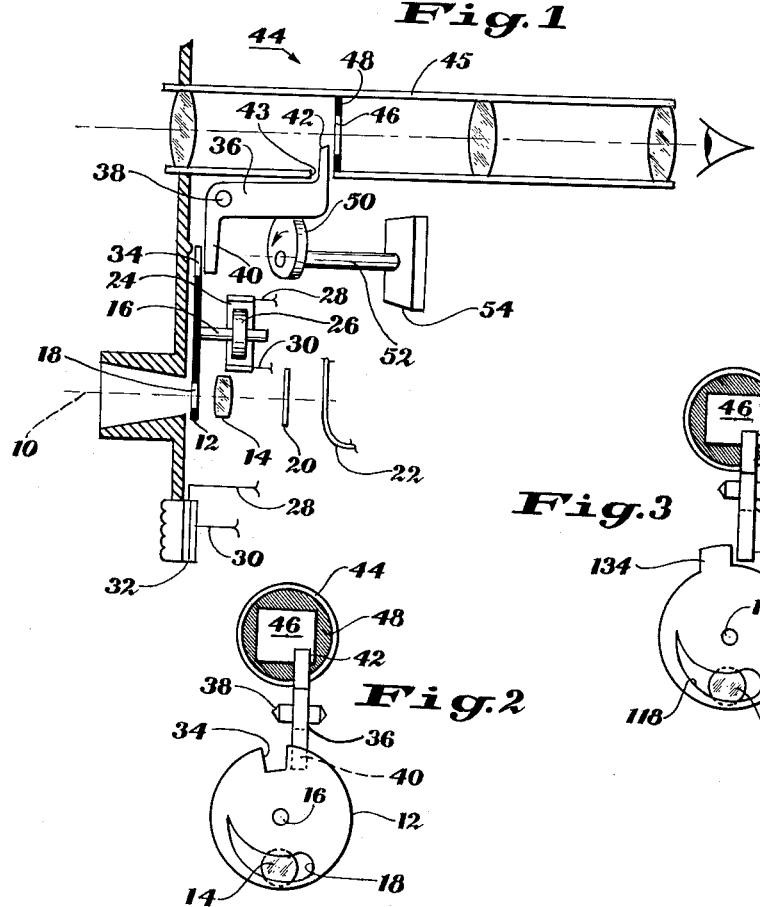
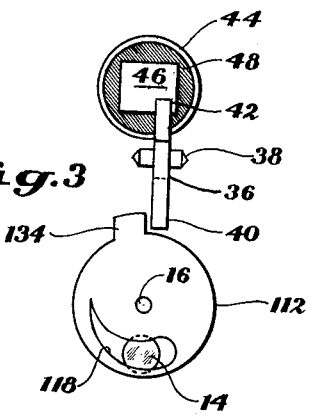
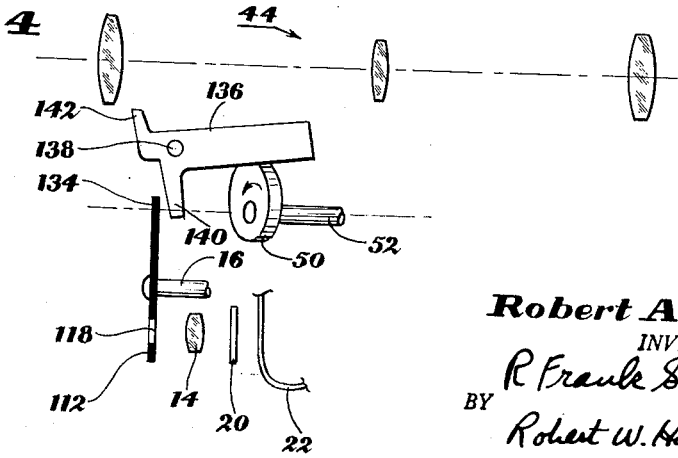
Robert A. Kirk
INVENTOR.
BY R Frank Smith
Robert W. Hampton
ATTORNEYS

United States Patent Office 3,021,771
Patented Feb. 20, 1962

3,021,771
FINDER SIGNAL FOR PHOTOGRAPHIC CAMERAS
Robert A. Kirk, Rochester, N.Y., assignor to Eastman Kodak Company, Rochester, N.Y., a corporation of New Jersey
Filed Oct. 2, 1959, Ser. No. 844,114
11 Claims. (Cl. 95—10)

The present invention relates to photographic cameras having automatic exposure control systems, and more particularly relates to means for indicating low scene brightness in such cameras.

It is convenient for the operator of a motion picture or still camera, which has an automatic exposure control system, to be warned when scene brightness is below the range for which the camera is designed. Numerous devices have been proposed for presenting a low-light signal to the camera operator in such cases. However, signals of this type generally have been illuminated by scene light, the intensity of which is quite low when the signal must be effective.

It is therefore a primary object of the present invention to warn the operator of a camera, which has an automatic exposure control system, when the scene brightness is less than a predetermined value, by means of a visible, mechanical signal.

It is a more particular object of the invention to move a mechanical flag into or out of the viewfinder of a camera when scene brightness falls below a predetermined value.

A further object of the invention is to control the movement of a mechanical flag into and out of the viewfinder of a camera by means of an automatic exposure control system in such camera, for warning the camera operator of low scene brightness.

A further object of the invention is to energize a flag of the foregoing type by means of a drive motor in the camera.

Other objects of the invention will appear from the following description, reference being made to the accompanying drawings, wherein:

FIG. 1 is a schematic right side view of the basic elements of a motion picture camera embodying one form of the present invention;

FIG. 2 is a front view of the diaphragm vane and signal apparatus illustrated in FIG. 1;

FIG. 3 is a front view of an alternate diaphragm vane for use with the signal flag; and FIG. 4 is a schematic right side view of the basic elements of a motion picture camera embodying a second form of the invention.

Referring to FIG. 1, a typical camera embodying the invention has a taking-lens axis 10 on which are arranged a diaphragm vane 12, a taking-lens system indicated generally at 14, a shutter 20 and a photosensitive surface such as a filmstrip 22. Referring also to FIG. 2 the diaphragm vane may be formed as a disk pivoted centrally on a shaft 16 and having a tapered, curved aperture 18, which moves in a path crossing the lens axis 10 for establishing an exposure aperture whose area is a function of the angular position of the diaphragm vane. The diaphragm vane may be positioned automatically, in a manner well known in the art, by means of a galvanometer coil 24, which is connected to and rotates the diaphragm shaft 16. Coil 24 cooperates with a permanent magnet core 26 and is connected by leads 28 and 30 to a photocell 32, which is exposed to scene light and energizes the coil. Variations in scene brightness cause corresponding variations in the energization of coil 24 and thereby cause the coil to move angularly about shaft 16 for establishing an angular position of the diaphragm vane 12 corresponding to scene brightness. The structure and operation of the galvanometer and photocell are well known in the art and may be of the type disclosed in U.S. Patent 2,509,893, granted May 30, 1950, to C. F. Taylor et al.

Although the drawings illustrate a motion picture camera wherein the exposure is automatically controlled by positioning a diaphragm vane, it will be understood that the invention has equal utility in conjunction with other forms of automatic exposure control, e.g., in motion picture or still cameras wherein shutter speed is automatically controlled instead of or in addition to diaphragm opening.

The diaphragm vane 12 or some other member moving in timed relation therewith has a signal control device, for example a peripheral discontinuity shown in FIG. 2 as a notch 34. This notch cooperates with a sensing arm 40 of a signal means comprising a lever 36, which is pivoted about a horizontal axis at 38. An upper arm 42 of lever 36 constitutes a signal flag, which is adapted to move into and out of an aperture 43 in the housing 45 of a finder 44 and to move into and out of alignment with an aperture 46 of a mask 48 in the finder. Hereafter in the specification and claims the term "finder" shall be understood to mean the entire solid angle of light framed by the sides of aperture 46 or the corresponding aperture of any other finder.

A cam 50, which is rotated by a shaft 52 driven by a camera motor shown schematically at 54, cooperates with lever 36 and raises the signal flap 42 into the finder during each rotation of shaft 52. In this embodiment, flag 42 is on that side of lever 36 that is lifted by cam 50. When the cam rotates away from the position shown in FIG. 1, lever 36 tends to rotate clockwise (as viewed in FIG. 1) by gravity for moving flag 42 out of the finder. However, when the diaphragm vane is in any position other than that aligning the widest portion of its aperture 18 with the taking lens 14, some portion of the vane's periphery is aligned with the path of the sensing arm 40 of lever 36 and prevents that lever from rocking counterclockwise. This causes flag 42 to remain visible in the finder. When the widest portion of aperture 18 of the diaphragm vane is aligned with the taking lens axis 14, notch 34 is aligned with arm 40 of lever 36 and permits that lever to rock clockwise during each rotation of cam 50, thereby alternately removing flag 42 into and out of the finder. This up-and-down movement of flag 42 warns the camera operator that the scene brightness is insufficient for normal photography. Motor 54 may be used for driving the film advance mechanism and/or the shutter mechanism in a manner well known in the art.

It may be desirable to reverse the foregoing operation so that the upper arm 42 of the bell crank remains constantly visible in the viewfinder only when scene brightness is below the acceptable level and reciprocates into and out of the viewfinder at all other times. This may be accomplished by providing an ear 134 (FIG. 3) instead of the notch 34 (FIGS. 1 and 2) for cooperation with the sensing arm 40 of lever 36. In this case, ear 134 prevents lever 36 from being rocked clockwise by gravity to remove flag 42 from the viewfinder, only when the widest portion of aperture 118 of the diaphragm vane 112 is aligned with the taking lens.

It may also be desirable to have the signal appear in the viewfinder only when scene brightness is below a predetermined level or to appear in the viewfinder only when the scene brightness is above a predetermined level. For this purpose, a lever 136 (FIG. 4) is pivoted at 138 and has an arm 140 and a signal flag 142, the latter of which is located on the side of lever 136 that is depressed by cam 50. This cam cooperates with lever 136 for rocking the latter counterclockwise during each cam cycle, thereby rocking flag 142 out of the viewfinder. During alternate half cycles, lever 136 tends to be rocked clockwise by gravity but is prevented from clockwise motion by the engagement of its sensing arm 140 with ear 134 (see also FIG. 3) of the diaphragm vane 112, when that ear is aligned with arm 140 at low scene brightness. Alternatively, arm 140 may cooperate with a notch 34 (FIG. 2) at low scene brightness to place flag 142 in the viewfinder only at that time.

The invention has been described in detail with particular reference to preferred embodiments thereof, but it will be understood that variations and modifications can be effected within the spirit and scope of the invention as described hereinabove and as defined in the appended claims.

I claim:
1. In a photographic camera having a finder and having an automatic exposure control system including a photocell adapted to be energized by scene light and a member moved under control of said photocell as a function of scene brightness to regulate the exposure of film in said camera, the combination comprising: a signal control device moving in timed relation with said member; a cyclically moving member; and signaling means including a flag adapted to move into and out of said finder and controlled jointly by said cyclically moving member and said signal control device for movement as a function of the position of said exposure regulating member.

2. The combination defined in claim 1, wherein said moving member comprises a diaphragm vane and wherein said signal control device comprises a peripheral portion of said vane having a discontinuity therein.

3. The combination defined in claim 2, wherein the discontinuity in the peripheral portion of said vane comprises a notch.

4. The combination defined in claim 2, wherein the discontinuity in the peripheral portion of said vane comprises an ear.

5. The combination defined in claim 2, wherein said signaling means comprises a pivoted lever having an arm cooperating with said peripheral portion of said vane.

6. The combination defined in claim 5, wherein said cyclically moving member comprises a cam in driving engagement with said lever for cyclically lifting one side of said lever against gravity.

7. The combination defined in claim 6, wherein said flag is disposed on the side of said lever that is lifted by said cam.

8. The combination defined in claim 6, wherein said flag is disposed on the side of said lever opposite the side lifted by said cam.

9. In a photographic camera having a finder and having an automatic exposure control system including a diaphragm vane moving angularly as a function of scene brightness to regulate the exposure of film in said camera, the combination comprising: signaling means having a sensing member and a flag and normally maintained by gravity in a first position wherein said flag is in said finder, a cyclically moving cam cooperating with said signaling means for cyclically moving the latter to a second position wherein said flag is out of said finder, said sensing member being reciprocated through a predetermined path in response to movement of said signaling means back and forth between its first and second positions; and an ear on said vane adapted to move into the path of said sensing member when said vane is moved to a position corresponding to low scene brightness, whereby said ear is engaged by said sensing member to prevent movement of said flag into said finder.

10. In a photographic camera having a finder, the combination comprising: an automatic exposure control system including a diaphragm vane with a notch in the periphery thereof and moving angularly as a function of scene brightness to regulate the exposure of film in said camera; signaling means having a sensing member and a flag and normally maintained by gravity in a first position wherein said flag is in said finder, a cyclically moving cam cooperating with said signaling means for cyclically moving the latter to a second position wherein said flag is out of said finder, said sensing member being reciprocated through a predetermined path in response to movement of said signaling means back and forth between its first and second positions, the notch in said vane being moved into the path of said sensing member when said vane is moved to a position corresponding to low scene brightness, whereby said sensing member enters said notch to permit movement of said flag into said finder.

11. In a photographic camera having a motor for advancing film, a finder, and an automatic exposure control system including a member moving as a function of scene brightness to regulate the exposure of film in said camera, the combination comprising: a signal control device moving in timed relation with said member, a drive member moved cyclically by said motor; and signaling means including a flag adapted to move into and out of said finder and controlled jointly by said cyclically moving member and said signal control device for movement as a function of the position of said exposure regulating member.

References Cited in the file of this patent
UNITED STATES PATENTS

| | | |
|---|---|---|
| 2,058,532 | Tuttle | Oct. 27, 1936 |
| 2,297,262 | Tonnies | Sept. 29, 1942 |
| 2,841,064 | Bagby | July 1, 1958 |
| 2,913,969 | Faulhaber | Nov. 24, 1959 |